March 17, 1925.  
C. F. CHRISTOPHER  
POWER TRANSMITTING MECHANISM  
Filed Aug. 29, 1924  
1,529,771  
5 Sheets-Sheet 2

Inventor  
C. F. Christopher  
By C. A. Snow & Co.  
Attorneys

March 17, 1925. 1,529,771
C. F. CHRISTOPHER
POWER TRANSMITTING MECHANISM
Filed Aug. 29, 1924 5 Sheets-Sheet 3

C. F. Christopher, Inventor
By C. A. Snow & Co.
Attorney.

March 17, 1925.  C. F. CHRISTOPHER  1,529,771
POWER TRANSMITTING MECHANISM
Filed Aug. 29, 1924   5 Sheets-Sheet 4
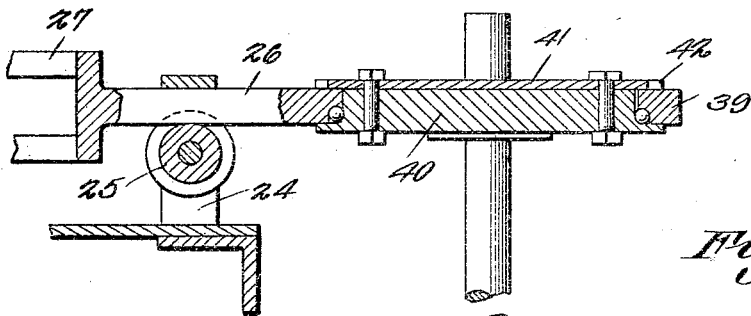
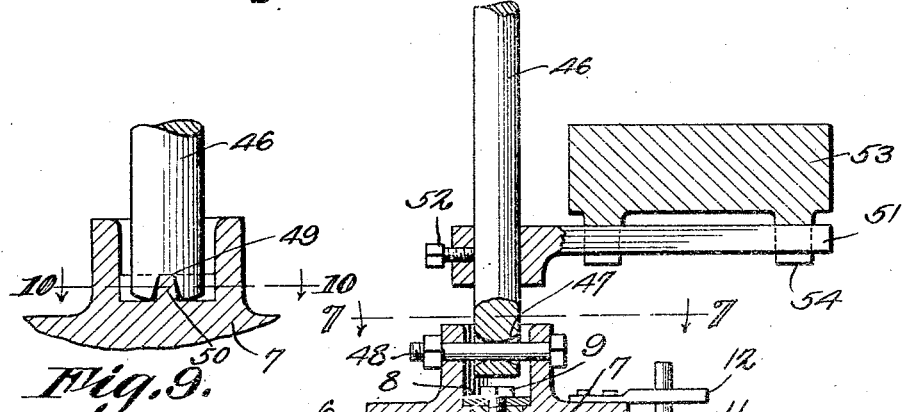
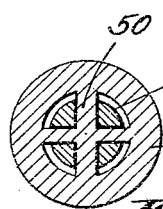
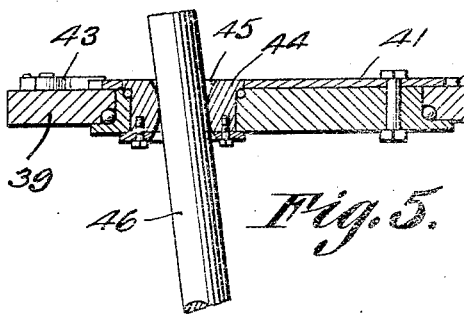
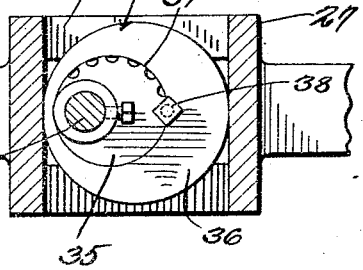

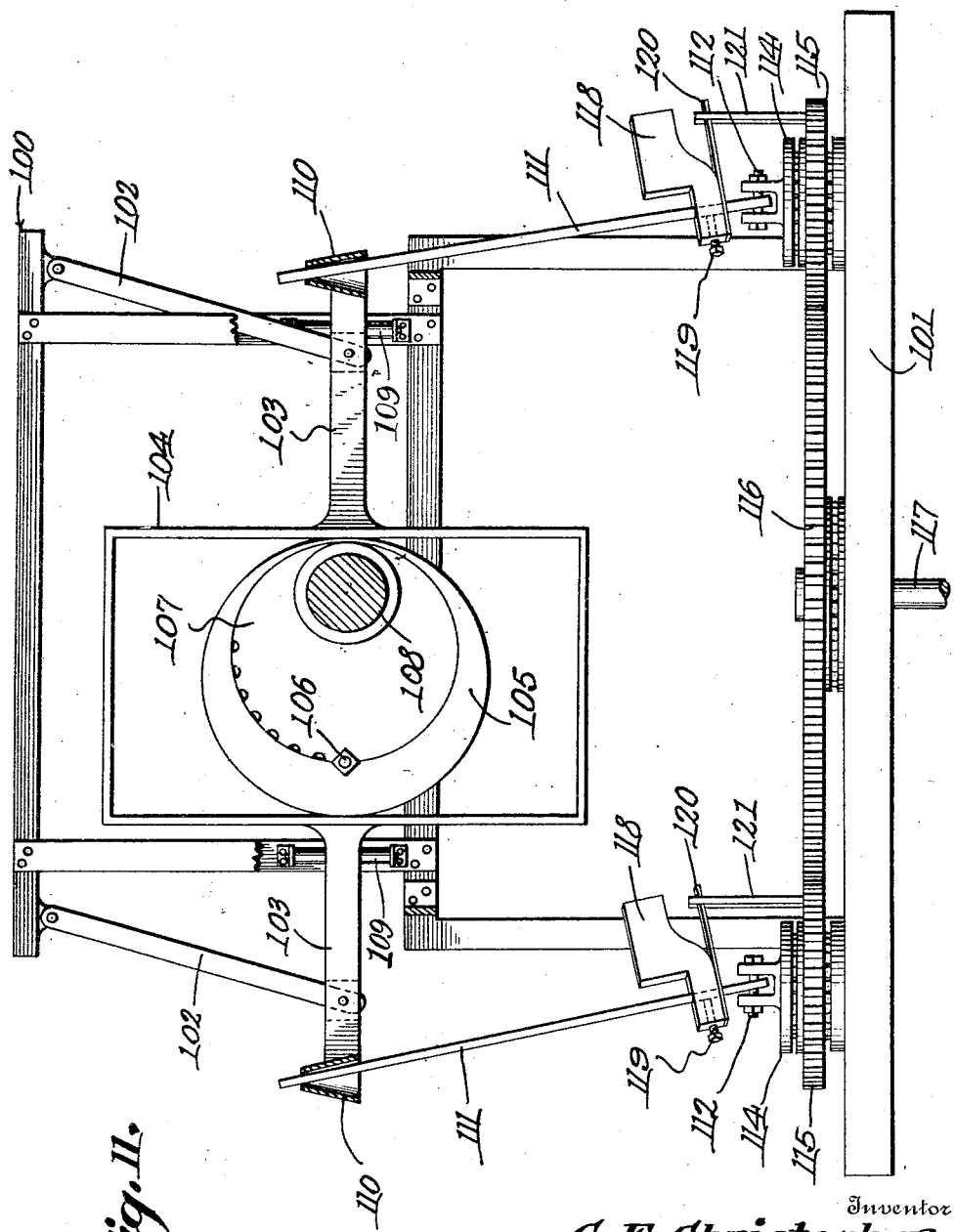

Patented Mar. 17, 1925.

1,529,771

UNITED STATES PATENT OFFICE.

CALVIN F. CHRISTOPHER, OF CANTON, NORTH CAROLINA, ASSIGNOR OF ONE-FOURTH TO FRANK J. BATES, OF ASHEVILLE, NORTH CAROLINA.

POWER-TRANSMITTING MECHANISM.

Application filed August 29, 1924. Serial No. 735,019.

*To all whom it may concern:*

Be it known that I, CALVIN F. CHRISTOPHER, a citizen of the United States, residing at Canton, in the county of Haywood and State of North Carolina, have invented a new and useful Power-Transmitting Mechanism, of which the following is a specification.

This invention relates to power transmitting mechanism, one of the objects of the invention being to provide rotatable gravity operated means whereby motion may be transmitted from a prime mover to a driven element.

A further object is to provide a mechanism, the gravity operated means of which are shiftable automatically in properly timed relation by the prime mover so that weights included in the mechanism can be constantly positioned to move by gravity and thereby impart a momentum to the mechanism which increases its efficiency.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Fig. 4 is an enlarged vertical transverse section on line 4—4, Fig. 1.

Fig. 5 is an enlarged section on line 5—5, Fig. 1.

Fig. 6 is an enlarged section on line 6—6, Fig. 1.

Fig. 9 is a view showing, in section, a modified form of bearings for one of the tiltable shafts.

Fig. 10 is a section on line 10—10, Fig. 9.

Fig. 11 is an elevation showing a modification, parts being in section.

Figure 1:
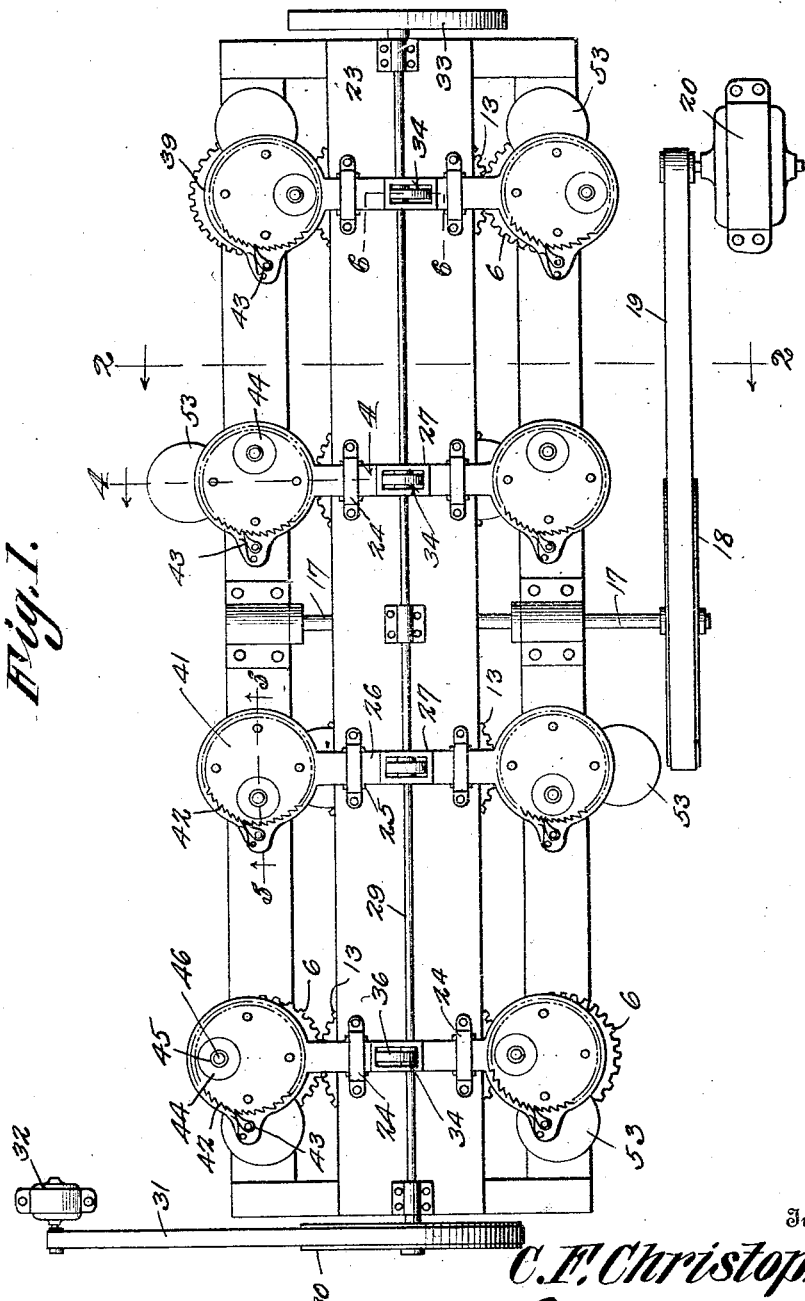
Figure 1 is a plan view of the mechanism.
Figure 2:
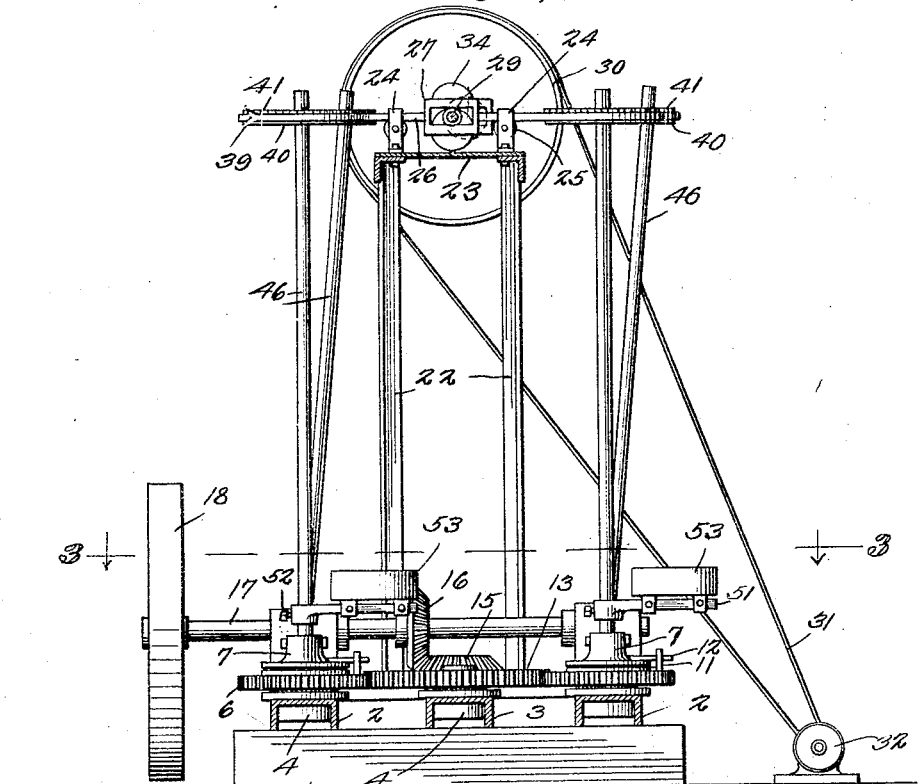
Fig. 2 is a section on line 2—2, Fig. 1.
Figure 7:
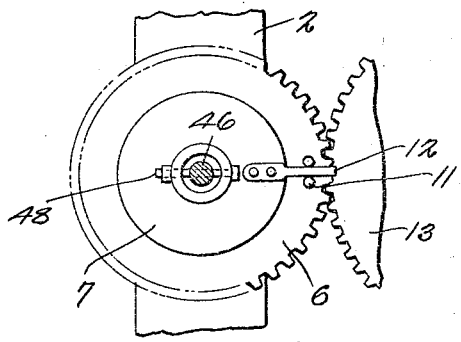
Fig. 7 is a section on line 7—7, Fig. 4.

Referring to the figures by characters of reference 1 designates the base frame of the machine. This frame includes parallel channeled side members 2 and middle member 3. Each of the members 2 is provided, at regular intervals, with bearing blocks 4 seated therein and resting thereon as shown particularly in Fig. 4. Each block 4 has a stud 5 projecting upwardly from the center thereof forming a bearing for a gear 6. The upper end of this stud is extended above the gear and constitutes a bearing for a socket member 7. For the purpose of attaching the socket member to the stud 5 a disk 8 is preferably seated within the socket member and is fastened by any suitable means, such as a bolt 9 to the end of the stud. This disk engages the bottom of the socket member as shown in Fig. 4. Suitable anti-friction bearings indicated generally at 10 may be interposed between each block 4 and the gear 6 and between each socket member 7 and the gear 6. Motion may be transmitted from the socket member to the gear and vice versa by spaced pins 11 projecting from the gear and extending to opposite sides of a finger 12 extending radially from the socket member 7.

Figure 3:
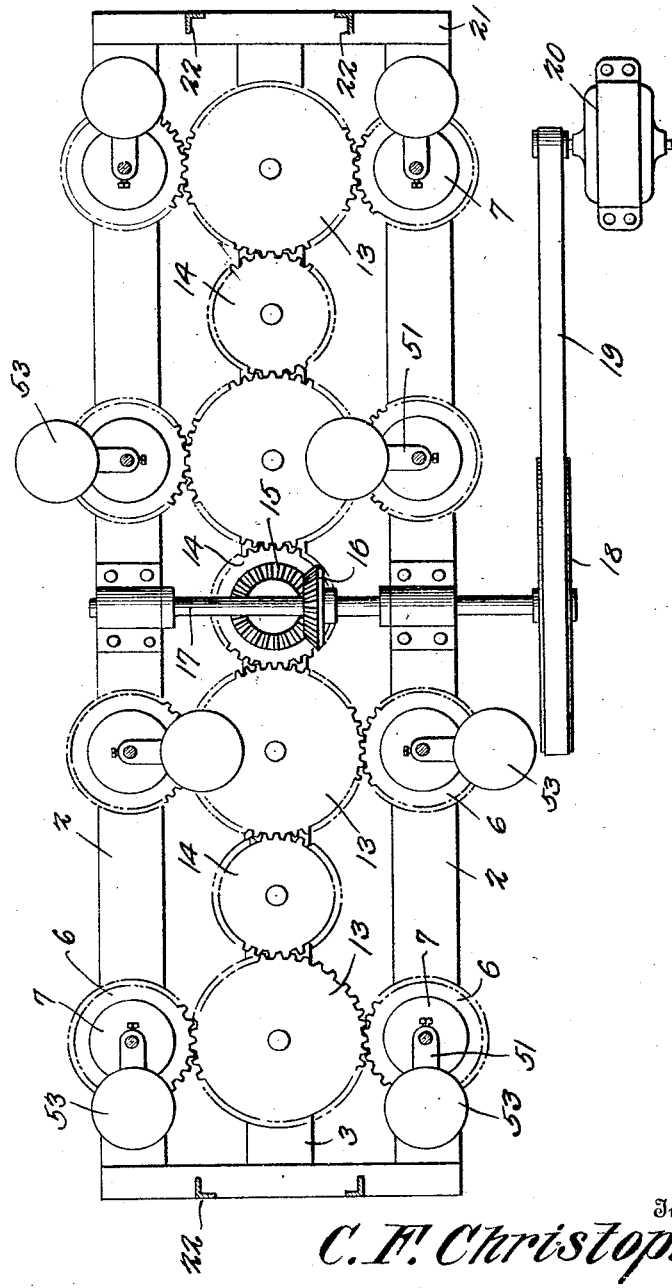
Fig. 3 is a section on line 3—3, Fig. 2, the prime mover being removed.

The middle channeled strip 3 is also provided with bearing blocks 4 such as already described and journaled on these blocks are gears 13 and 14. The gears 13 are interposed between the opposed gears 6 as shown particularly in Fig. 3 while the gears 14 serve to transmit motion between the gears 13. One of the gears 14 has a bevel gear 15 rotatable therewith and constantly meshing with another gear 16 secured to a transverse shaft 17. This shaft is journaled in suitable bearings on the channeled members 2 and is provided with a pulley 18 for transmitting motion through a belt 19 to a generator 20 or other suitable driven element.

Cross beams 21 are mounted on the ends of the channeled members 2 and 3 and support standards 22 on which is secured a shelf 23. Mounted on this shelf are spaced pairs of guides 24. Each of these guides has a supporting roller 25 journaled therein and mounted on the supporting rollers in the guides of each pair are arms 26 which extend in opposite directions from a cross head 27. The several cross heads are slotted longitudinally as shown at 28 and extending through these slots is a longitudinal drive shaft 29 journaled on the shelf 23. A pulley 30 is secured to this shaft and is adapted to receive motion through a belt 31 or the like from a prime mover 32 which can be in the form of an electric motor or a suitable driving element. A fly wheel 33 can be connected to shaft 29 as shown.

Secured to the shaft 29 so as to work within the several cross heads 27 are eccentrics 34. Each eccentric preferably consists of outer and inner adjustably connected portions as clearly shown in Fig. 6, the inner eccentric portion 35 being secured to the shaft 29 while the outer portion 36 has an eccentric opening 37 in which the portion 35 is seated. These portions are held properly assembled by a bolt 38 extending between them.

The beveled gears are all of the same size and proportions. They are so positioned, however, that the long radii of the several eccentrics are each disposed 90° in advance of the long radius of the next adjoining eccentric. This is particularly true where four eccentrics are used as in the present machine.

The outer ends of each of the arms 26 are enlarged as at 39 to provide a bearing for a disk 40. To this disk is secured plates 41 having toothed peripheries as shown at 42. A pawl 43 can be mounted on each enlargement 39 for the purpose of adhesing the adjacent toothed seats so as to hold the disk 40 against retrograde movement.

Each disk 40 is provided, adjacent its periphery, with a rotatable bearing 44 which, as shown in Fig. 5, has an opening 45 extending therethrough. The ends of this opening are flared.

The upper end of a rotatable shaft 46 is located within each of the openings 45 and the lower ends of these shafts project into the socket members 7 to which they are tiltably mounted. Shaft 46 is thus free to tilt in any direction upon the pin but when rotated, will cause the socket members 7 to likewise rotate. Instead of providing this connection, however, the lower ends of the shaft 46 can be provided with crossed intersecting grooves 49 into which project intersecting ribs 50. Thus shaft 46 can tilt in any direction and at the same time transmit motion through the ribs to the socket members 7.

The bearings 44 adjacent each side of the shelf 23 are so positioned that each bearing is rotated 90° in advance of the next adjoining bearing. The bearings at the opposite side of the shelf 23 are similarly located. This will be apparent by referring to Fig. 1.

Figure 8:
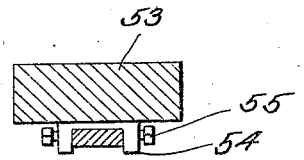
Fig. 8 is a transverse section through one of the weights showing the means for adjustably connecting it to its supporting arm.

Each of the shafts 46 has a radial arm 51 adjustably connected thereto as shown at 52. On each arm is mounted a weight 53 having forked ears 54 which straddle the arm and are adapted to be held thereto by set screws 55 or the like as shown in Fig. 8.

When the motor 32 is operated motion will be transmitted therefrom to the shaft 29 and this will cause the cams 34 to rotate simultaneously, motion being transmitted to the cross heads 27 and their arms 26 with the result that the upper ends of the shaft 46 will be shifted to new positions. As the angles of the shafts are thus changed the weighted arms 51 extending from the shaft will swing by gravity to new positions, thus setting up rotations of the shaft 46 and corresponding rotation of the gears 6. Thus motion will be transmitted to the gears 13 and 14 and ultimately the gears 15 and 16 and the driven elements 20. As the movement of the shaft 29 is continuous the upper ends of the shafts 46 will be moved in circles continuously and the weighted arms 51 will thus be caused continuously to rotate and cause the shaft to continuously drive the gears 13 and 14.

In Fig. 11, the device is shown as comprising a frame 100, including a base 101. The upper ends of links 102 are pivoted to the upper portion of the frame 100, the lower ends of the links being pivoted to arms 103 on an approximately rectangular member 104, within which operates an outer eccentric 105, connected for circumferential adjustment, as indicated at 106, to an inner eccentric 107 on the shaft 108, supported in any desired way. The arms 103 of the member 104 operates between anti-friction devices, such as rollers 109 on the frame 100. The arms 103 of the member 104 are equipped at their ends with inverted conical sockets 110, wherein the upper ends of driven shafts 111, corresponding to the shafts 46 are received. The lower ends of the shafts 111 are connected, as indicated generally at 112, after the manner shown in Figure 4, to rotatable members 114, the gears corresponding to the gears 6, being shown at 115, and cooperating with a central gear 116, which is connected to a shaft 117. Radial weights 118 are connected adjustably, at 119, to the shafts 111, the weights carrying fingers 120, cooperating with pins or other projections 121, on the gears 115.

The operation of the device delineated in Figure 11 will be understood readily from what has been stated hereinbefore concerning the devices shown in the other figures.

What is claimed is:—

1. In power transmitting mechanism the combination with spaced shafts mounted for rotation, of motor driven means for imparting a circular motion to one end of each shaft, a weighted radial arm extending from and fixedly connected to each shaft, and a driven element operatively connected to and adapted to be actuated by the shaft.

2. Power transmitting mechanism including spaced shafts mounted for rotation, power driven means for swinging one end of each shaft in a circle, a weighted arm fixedly connected to and extending radially from each shaft, each arm constituting means for rotating the shaft when one end of the shaft is moved in a circle, a driven element, and means for taking power from the rotating shaft and transmitting it to the driven element.

3. Power transmitting mechanism including shafts arranged in pairs and mounted for rotation about individual axes, power driven means for imparting orbital motion to one end of all of the shafts simultaneously, a weighted arm fixedly connected to and radiating from each shaft for imparting rotation to the shaft during the orbital movement of one end thereof, a driven element, and means for transmitting motion from the several shafts simultaneously to the driven element.

4. Power transmitting mechanism including gears arranged in pairs and mounted for rotation about individual axes, shafts tiltably connected to the respective gears, power driven means for positively imparting an orbital movement to one end of the shafts simultaneously, driving connections between the shafts and the gears, a weighted arm fixedly connected to and radiating from each shaft for rotating the shaft and its gear during the orbital movement of one end of the shaft, a driven element, and means for transmitting motion through the driven element from all of the gears.

5. Power transmitting mechanism including gears mounted for rotation about individual axes, shafts rotatable with but tiltable relative to the respective gears, said shafts being arranged in pairs, crossheads interposed between the shafts of the respective pairs, rotatable disks connected to and movable with the cross heads and providing bearings for one end of each pair, power driven means for reciprocating the cross heads and the disk, weighted arms radiating from the respective shafts for holding said shafts suspended and for rotating the shafts during the reciprocation of the cross heads, thereby to impart an orbital movement to one end of each shaft, a driven element, and means for transmitting motion through said element from the gears of the several shafts simultaneously.

In testimony that I claim the foregoing as my own, I have hereto affixed my signature in the presence of two witnesses.

CALVIN F. CHRISTOPHER.

Witnesses.
C. E. BROWN,
LURA WRIGHT.